Dec. 15, 1959  W. H. BRINKMAN  2,916,866
PUSH TYPE MOWER
Filed Dec. 24, 1957  3 Sheets-Sheet 1
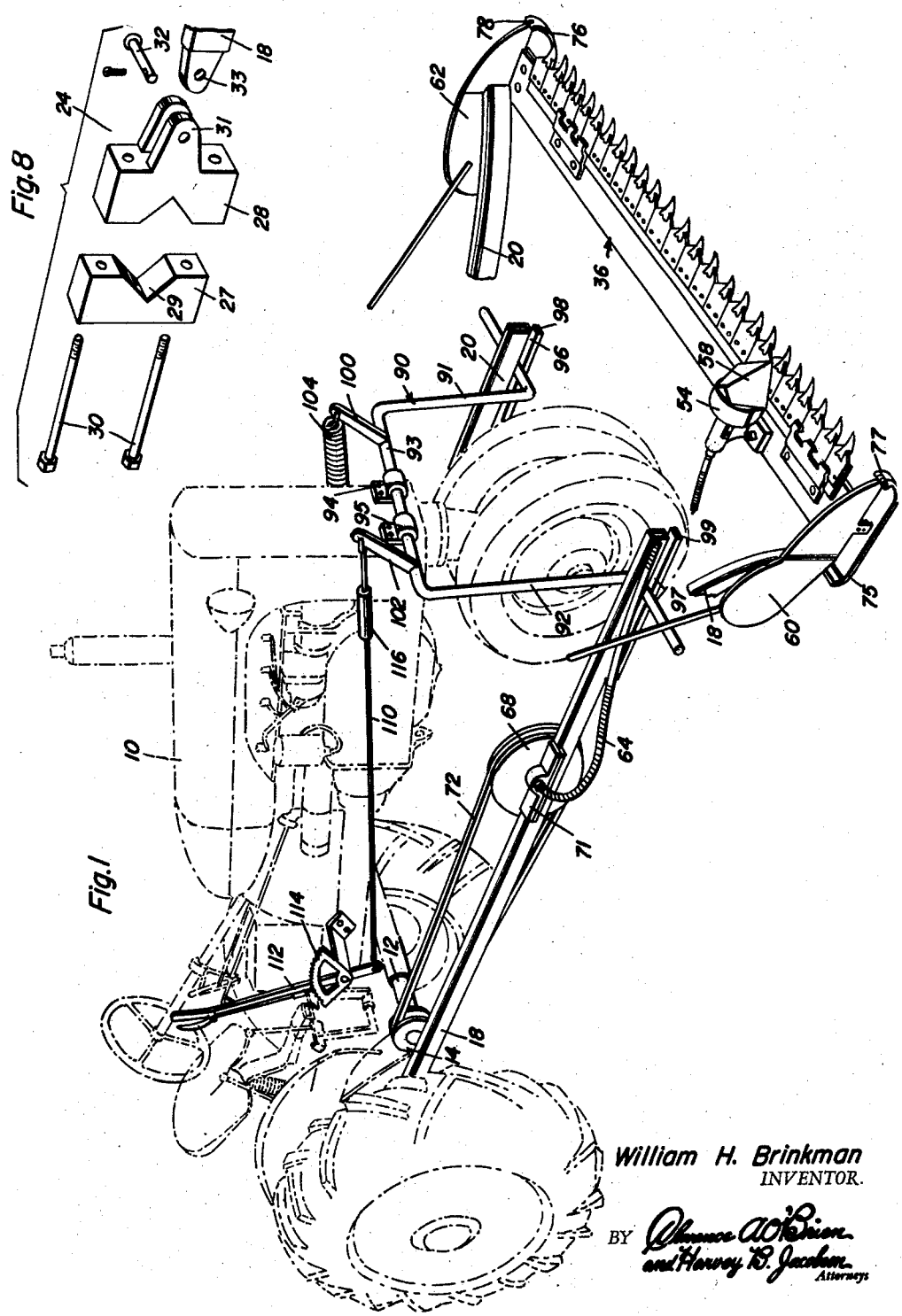
William H. Brinkman
INVENTOR.

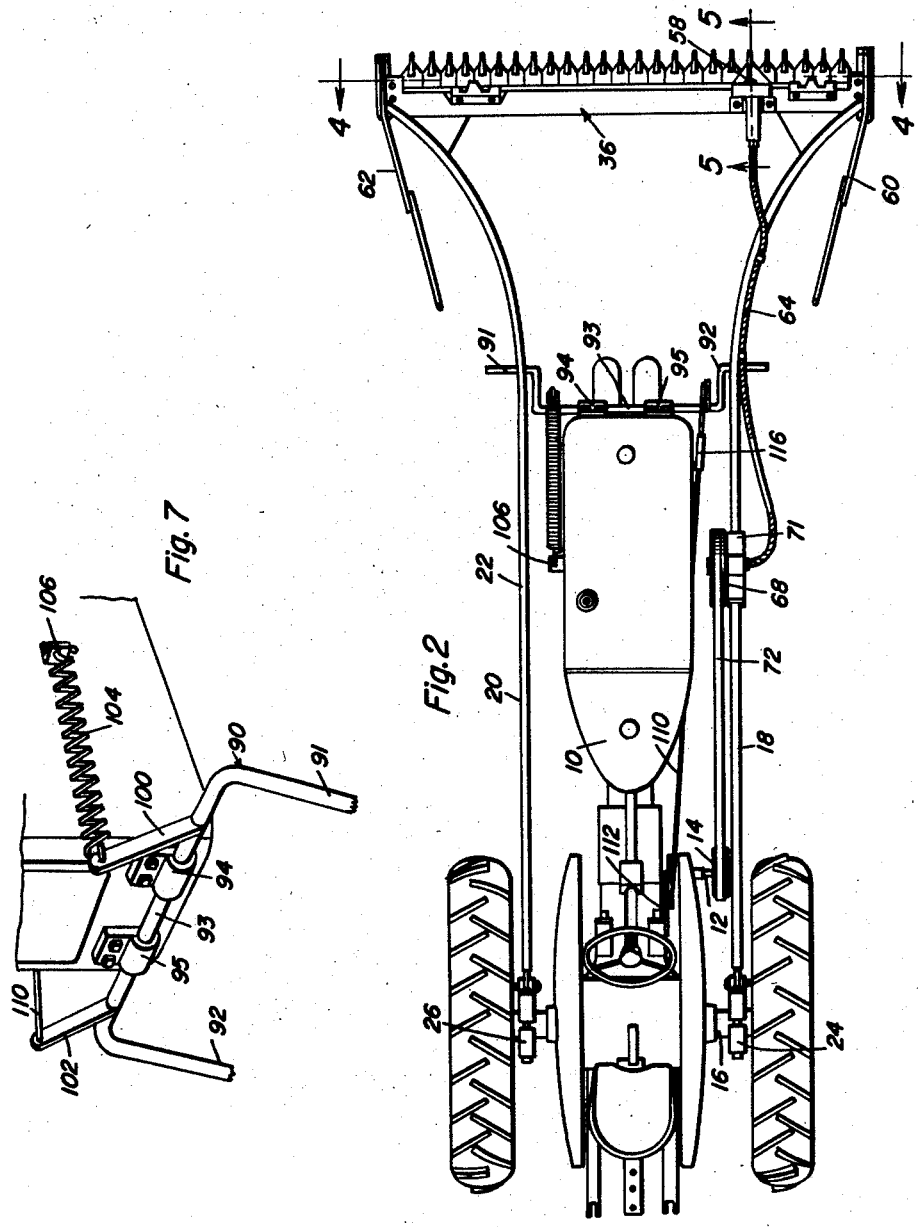

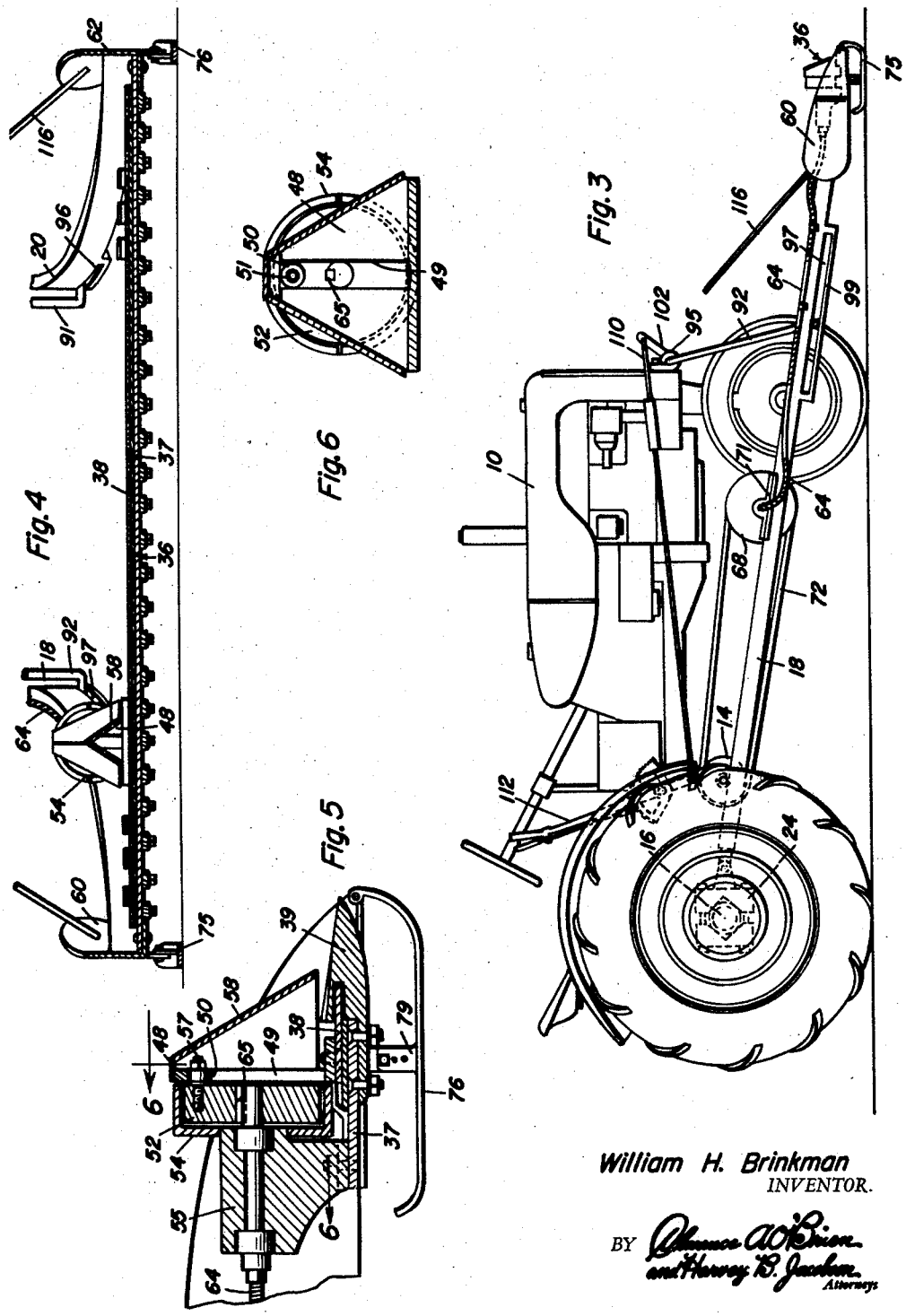

United States Patent Office
2,916,866
Patented Dec. 15, 1959

2,916,866

PUSH TYPE MOWER

William H. Brinkman, Rifle, Colo., assignor of fifty percent to James O. Kitt, Grand Junction, Colo.

Application December 24, 1957, Serial No. 704,962

5 Claims. (Cl. 56—25)

This invention relates to a push type mower and more particularly to a mower which is adapted to be connected to a tractor, jeep or other vehicle and to use power derived from the vehicle for actuating the mower mechanism.

An object of the invention is to provide a push type mower which is superior to other types of mowers because of the better visibility that is provided in front of the operator as he is able to see the mowing operation taking place in front of him. The mower has a great advantage in cutting cleaner, not leaving a part of the crop crushed to the ground as is the case when operating other types of mowers.

The mower can be the same width as the propelling vehicle so that it is more maneuverable than other types of mowers in that it will reach into and cut clean any area into which it is possible to drive the front end of the tractor. The mower will cut from the left or right side of the field without making any changes or adjustments and this is not possible of other types of commercially available mowers.

With the arrangement of mower described herein the sickle bar runs constantly instead of stopping when the vehicle is stopped as is the case of others that rely on the forward motion of the mowing machine to move the reciprocating sickle bar. Therefore the push type mower of my invention has a full mowing action regardless of how slowly the vehicle may be operated.

A further object of the invention is to provide a push type mower that is mounted on the front of a propulsion vehicle and has a mower frame including sides or rails that pivot by couplings to the rear axle or rear drawbar of the propelling vehicle. It is preferred that the vehicle on which the mower is applied have a source of power, for example an ordinary power take-off, from which the reciprocatory action of the movable sickle bar is obtained. Grass boards are at the ends of the mower head and located near the ground engaging shoes which, of themselves are improved over others in that they are adjustable and are of sufficient length to ride over irrigation corrugates.

A very mechanically simplified means for raising the head of the mower has been devised. These means allow the head to float slightly in order to care for irregularities in the land, and they are readily accessible to the operator of the vehicle. This is a distinct improvement over rigidly attached implements on tractors which do not take into account the terrain irregularities. Instead the mower lifts and dips or twists. The mower of the invention floats over these irregularities by virtue of the entire construction and especially the features enabling and caring for the raising and lowering of the mower in accordance with land irregularities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a mower constructed in accordance with the invention, with parts broken away and shown in section and illustrating the tractor by dotted lines.

Figure 2 is a top view of the tractor and mower of Figure 1.

Figure 3 is a side view of the tractor and mower of Figure 1.

Figure 4 is an enlarged sectional view taken on the line 4—4 of Figure 2.

Figure 5 is an enlarged cross sectional view of the means for operating the sickle bar of the mower and taken on the line 5—5 of Figure 2.

Figure 6 is a sectional view taken approximately on the line 6—6 of Figure 5.

Figure 7 is a fragmentary perspective view of a part of the means for elevating the mower.

Figure 8 is an exploded perspective view of one clamp used in the attachment of the mower to the vehicle.

In the accompanying drawings there is shown a tractor 10 which schematically represents any kind of vehicle suitable for use in mowing. The illustrated vehicle is an ordinary tractor that has a power take-off shaft 12 on which power take-off pulley 14 is mounted. Rear axle 16 has the sides or rails 18 and 20 of mower 22 attached thereto by a pair of clamps 24 and 26. Each clamp is made of a pair of jaws 27 and 28 (Figure 8) having seats 29 which embrace the rear axle housing. A plurality of bolts 30 pass through aligned passages in the jaws 27 and 28 and hold the clamp fastened to the axle housing. Mounting brackets 31 are a part of jaw 28 and have a pin 32 passed through aligned apertures in them. The pin also passes through an aperture 33 in the inner end of rail or side 18 and this mounts the inner extremity of the rail or side for pivotal movement on the back axle housing of the tractor. The clamp 26 is made identical to clamp 24 and mounts the inner end of the side or rail 20 for pivotal movement on the same axle housing. The outer ends of the rails are smoothly curved outwardly to a predetermined width. The mower head 36 is made the same length as the tractor tread or slightly in excess thereof so that the mower can be operated in substantially any place where the tractor can be maneuvered.

Mower head 36 is of an essentially conventional construction consisting of a stationary bar 37 and a moving sickle bar 38 in front of which a plurality of stationary spaced teeth 39 protrude. This much of the head is conventional. The moving sickle bar 39 is driven by a pitman cam follower 48 that has an upright slot 49 accommodating a sealed bearing 50 on pin 51 which is used to horizontally reciprocate the pitman cam follower. Pitman wheel 52 is mounted in removable shield 54 that is carried by mounting bracket 55 on stationary bar 37. A removable shield 58 is attached to the pitman cam follower 48 and functions as a grass cover. The pitman wheel must be mounted far enough from the end of the sickle bar to allow grass to fall and pass between the pitman wheel and the grass board 60 at one end of the head 36. The other grass board 62 is at the opposite side of the head 36. As shown in Figure 1 the grass boards are attached to the extremities of rails 18 and 20 and include straight parts and rear parts that are bent inwardly slightly.

To complete the drive for the movable sickle bar, a flexible drive cable 64 is used. One end has a fitting keyed as at 65 to the wheel 52 while the other end is attached to the intermediate pulley 68. The flexible drive cable 64 is armored, as a Borden wire, and has lubricant in it. The pulley 68 is mounted for rotation in a bearing 71 on rail 18. This is an intermediate part of the drive to obtain proper sickle bar speeds and could be omitted if the proper speed were available at the power take-off. Belt 72 or some other type of transmission is used to drivingly connect the power take-off and the flexible drive cable. In the illustrated instance the belt 72 is mounted on the pulleys 14 and 68.

Ground engaging shoes 75 and 76 are hinged as at 77 and 78 to the front ends of the grass boards 60 and 62. The hinge is for adjustment of the shoes. They have upturned front and rear ends enabling them to slide easily over irrigation corrugates or other irregularities in the terrain. Adjustable hangers 79 attach the intermediate parts of the shoes 75 and 76 to the stationary bar of head 36. These hangers can be in the form of pairs of straps with a bolt connecting them together through selected apertures of groups of apertures in the straps.

The described mower head could rest directly on the ground (using shoes 75 and 76) and operated in a field for mowing. However, I have provided means for lifting the mower head to selected adjusted positions and to hold the adjustments correctly but yet allow for a limited degree of floating as is necessary when irregularities in the land are encountered. These means consist of a crank 90 that has crank arms 91 and 92 and a connecting section 93. The connecting section is mounted in bearings 94 and 95 carried at the front of the vehicle 10 and mounting the crank for oscillation. The extremities of the crank arms are held captive in slots 96 and 97 formed by bars 98 and 99 welded or otherwise fastened to the rails 18 and 20 in spaced relation. It is understood that slots 96 and 97 could be formed in other ways, such as by forming elongated slots directly in the sides 18 and 20, so long as they are able to accept and constrain the movement of the extremities of the crank arms 91 and 92.

Arms 100 and 102 are fixed to the center section 93 and protrude laterally from it. A spring 104 is attached at one end to arm 100 and anchored at the other end to a bracket 106 on the vehicle. The spring helps to retain the mower in a raised position by yieldingly opposing the motion of the crank 90 in one direction. Arm 102 has a link 110 pivoted to it. The link is also pivoted to lever 112 whose handle is accessible to the operator of the vehicle. A ratchet locking device 114 is operatively associated with the lever and its handle and is used to hold the lever in a selected position. Link 110 has a sliding coupling 116 intermediate its ends. The coupling is made of a sleeve with stops at its ends. The inner, spaced and confronting ends of the link 110 have heads which engage the stops to form a positive drive when the link 110 is either pushed or pulled but permits some extending and retracting of the link 110.

In use the tractor 10 is operated in the ordinary way. The movable sickle bar is continually operated regardless of the forward motion of the tractor, inasmuch as it is driven from the tractor power take-off. As a desired height of cut is required, the tractor operator can manipulate the lever 112 thereby moving crank 90. This causes the sides 18 and 20 to be lifted by the action of the crank arms 91 and 92 in their slots 96 and 97. The mower is gravity lowered. Spring 104 aids in lifting the mower while the extension and retraction permitted in link 110 enables the mower head to be tilted and raised and lowered slightly in accordance with ordinary irregularities encountered in the land.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:
1. The combination of a tractor and a front mounted mower comprising a pair of transversely spaced side rails extending longitudinally at opposite sides of said tractor, means pivotally connecting rear ends of said side rails to the tractor whereby front ends of the side rails may be lowered and raised, the front end portions of said side rails being provided with longitudinally extending slots, a mower head extending transversely between and carried by the front ends of said side rails forwardly of the tractor, power means operatively connected to said mower head for actuating the same, an inverted U-shaped crank including a pair of arms and a bight portion pivoted to the front end of said tractor for swinging about a transverse horizontal axis, a pair of horizontally angulated arm portions provided at the ends of the arms of said crank and operatively disposed in said slots in said side rails whereby the side rails may be raised and lowered by a swinging movement of said crank and whereby the crank may be swung by raising and lowering movement of said rails, a control lever pivoted to said tractor, and a link operatively connecting said lever to said crank whereby said side rails may be raised and lowered by manipulation of said lever, said link including a pair of sections and a coupling slidably connecting said sections together whereby the link may be extended and contracted within predetermined limits to permit raising and lowering of said side rails independently of manipulation of said lever.

2. The device as defined in claim 1 together with resilient means operatively connected to said crank for biasing said side rails upwardly.

3. The device as defined in claim 1 together with a pair of ground engaging shoes pivotally mounted at the ends of said mower head.

4. A mower attachment for tractors comprising a pair of transversely spaced side rails having rear ends adapted for pivotal connection to a tractor whereby the front ends of the side rails may be lowered and raised, the front end portions of said side rails being provided with longitudinally extending slots, a mower head extending transversely between and carried by the front ends of said side rails, power means operatively connected to said mower head for actuating the same, an inverted U-shaped crank including a pair of arms and a bight portion adapted to be pivotally connected to a tractor for swinging about a transverse horizontal axis, a pair of horizontally angulated arm portions provided at the ends of the arms of said crank and operatively disposed in said slots in said side rails whereby the side rails may be raised and lowered by a swinging movement of said crank and whereby the crank may be swung by raising and lowering movement of said rails, a control lever adapted to be pivoted to a tractor, and a link operatively connecting said lever to said crank whereby said side rails may be raised and lowered by manipulation of said lever, said link including a pair of sections and a coupling slidably connecting said sections together whereby the link may be extended and contracted within predetermined limits to permit raising and lowering of said side rails independently of manipulation of said lever.

5. The device as defined in claim 4 together with resilient means operatively connected to said crank for biasing said side rails upwardly.

References Cited in the file of this patent
UNITED STATES PATENTS

| | | |
|---|---|---|
| 2,340,488 | Paradise et al. | Feb. 1, 1944 |
| 2,468,312 | Turner | Apr. 26, 1949 |
| 2,485,383 | Hoyt | Oct. 18, 1949 |
| 2,513,703 | Annis | July 4, 1950 |
| 2,603,052 | Pelham | July 15, 1952 |
| 2,629,219 | Hooley | Feb. 24, 1953 |
| 2,680,946 | Rousey | June 15, 1954 |
| 2,724,940 | Hirschkorn | Nov. 29, 1955 |